US007909992B2

(12) United States Patent
Lewis-Gray et al.

(10) Patent No.: US 7,909,992 B2
(45) Date of Patent: Mar. 22, 2011

(54) SEPARATION APPARATUS

(75) Inventors: Alexander Hamilton Lewis-Gray, Ballarat (AU); Nicholas Katsikaros, Ballarat (AU)

(73) Assignee: Gekko Systems Pty Ltd., Ballarat (VIC) (AU)

( * ) Notice: Subject to any disclaimer, the term of this patent is extended or adjusted under 35 U.S.C. 154(b) by 902 days.

(21) Appl. No.: 11/574,114

(22) PCT Filed: Sep. 9, 2005

(86) PCT No.: PCT/AU2005/001369
§ 371 (c)(1),
(2), (4) Date: Jul. 10, 2007

(87) PCT Pub. No.: WO2006/029444
PCT Pub. Date: Mar. 23, 2006

(65) Prior Publication Data
US 2008/0135460 A1 Jun. 12, 2008

(30) Foreign Application Priority Data
Sep. 17, 2004 (AU) .............................. 2004905349

(51) Int. Cl.
*B01D 15/02* (2006.01)
(52) U.S. Cl. ......... 210/189; 210/280; 210/283; 210/289
(58) Field of Classification Search .................. 210/189, 210/69, 280, 269, 675, 283, 289
See application file for complete search history.

(56) References Cited

U.S. PATENT DOCUMENTS

| 3,092,515 | A | * | 6/1963 | Pike et al. ..................... 134/25.5 |
| 4,085,043 | A | * | 4/1978 | Ellis .............................. 210/694 |
| 4,623,466 | A | | 11/1986 | Savall |
| 5,236,676 | A | | 8/1993 | Touro et al. |
| 5,535,992 | A | | 7/1996 | Krause |
| 6,228,257 | B1 | * | 5/2001 | Arnaud ......................... 210/189 |

FOREIGN PATENT DOCUMENTS

| DE | 2135818 A1 | 2/1973 |
| DE | 3911675 | 11/1989 |
| NL | 8602562 | 5/1988 |
| RU | 2 034 056 | 4/1995 |
| WO | 0067906 | 11/2000 |
| WO | 03070993 | 8/2003 |

OTHER PUBLICATIONS

Database WPI Week 198628; Thomson Scientific, London, GB; AN 1986-181221 (XP002500642 & RO 87 823 A) Barza Intr Miniera, Nov. 30, 1985 *abstract*.

* cited by examiner

*Primary Examiner* — Matthew O Savage
(74) *Attorney, Agent, or Firm* — Volpe and Koenig, PC

(57) ABSTRACT

A separation apparatus comprising, a series of compartments for holding particulate separation material, arranged so as to allow fluid to flow through the compartments in a primary direction from a first compartment in the series to a last compartment in the series, feed means for directing a flow of the fluid into the first of the series of compartments in the primary direction, barrier means for preventing flow of particulate separation material between compartments in the primary direction, and a pumping assembly arranged to pump a mixture of the particulate separation material and the fluid from the first compartment into a recovery stage.

13 Claims, 6 Drawing Sheets

SEPARATION APPARATUS

FIELD OF THE INVENTION

This invention relates to a separation apparatus for separating one or more components of a liquid mixture from the liquid. It relates particularly but not exclusively to an apparatus for ion exchange.

BACKGROUND OF THE INVENTION

Ion exchange resins are used in a large range of applications for preferentially removing selected ions from solution. Typically, a solution is passed into contact with the ion exchange resin selected for a particular ion until the resin is loaded with the particular ion to a desired level.

The ion exchange resin is then subjected to an elution process with an elutant such as acid or ammonia to release the desired ion from the resin and present it in concentrated form in the eluted solution.

In large scale operations such as are found in the mining industry, particularly in relation to the mining of gold, ion exchange resins have been used to preferentially separate gold from a gold bearing solution. This approach is effective in certain types of mining operations. However, given the large scale of mining operations, the quantities of resin involved and the various processing steps, the construction of sophisticated apparatus for handling the various aspects of processing can be quite costly and the efficiencies achievable are not always optimal.

In a typical construction, a number of columns containing resin may be arranged on a carousel with a proportion (eg. half) of the columns being arranged so as to receive a feed of gold bearing solution to trickle down through the resin in the column. The remainder of the columns are at the same time subjected to elution to strip gold from the loaded resin contained in the columns. After the first group of columns has been sufficiently charged with gold, the carousel rotates so as to present the columns containing stripped ion exchange resin to the gold bearing liquid flow whilst at the same time presenting the now gold bearing resin to the stages of the elution process.

The complexity effectiveness and cost of this type of operation is such that there is scope for improvement in different aspects of the process.

Thus, the present invention seeks to provide an alternative process which does not require the use of a carousel.

DISCLOSURE OF THE INVENTION

The invention provides in one aspect, a separation apparatus comprising,
a series of compartments for holding particulate separation material arranged so as to allow fluid to flow through the compartments in a primary direction from a first compartment in the series to a last compartment in the series,
feed means for directing a flow of the fluid into a first of the series of compartments in the primary direction from a first compartment in the series to a last compartment in the series,
barrier means for preventing flow of particulate separation material between compartments in the primary direction, and
a pumping assembly arranged to pump a mixture of the particulate separation material and the fluid from the first compartment into a recovery stage.

Suitably, the apparatus includes return means for returning recovered particulate material after treatment in the recovery stage to the series of compartments. It may be returned as a first step to the last compartment.

Whilst the following discussion will be largely directed to the separation apparatus being used in relation to uses where the particulate separation material is an ion exchange resin, it is to be appreciated that the invention can be used with any particulate separation material which can be used to remove a chemical component mixed with a liquid. Examples of other particulate separation materials may include carbon granules, aggregates coated with surface active agents, especially biologically active service agents targeted to particular organic molecules, etc.

The plurality of compartments may be stacked one atop the other. The stack may comprise a form of column. The compartments may be separated by screen means acting as the barrier means between compartments. The screen means may be arranged so as to prevent movement of the particulate separation material between compartments in the stack in the primary flow direction. The screen means may have a chosen screen size which stops movement of the particulate separation material therethrough but allows movement of smaller particulate material entrained in the fluid (eg. grit, dust, dirt) through the screen means.

The screen means may comprise a number of mesh elements. The mesh elements may run parallel to each other to define a gap therebetween. In the case of the particulate separation material being an ion exchange resin, the gap may typically be set at between 0.2 and 1 mm, more preferably between 0.4 and 0.6 mm. The screen elements themselves may comprise wedge wire, ie. the front of the screen element is wider than its rear giving the element a generally wedge shaped cross section. The use of wedge wire helps to reduce the likelihood of particulate material being "hung up" in the screen.

Agitation means may be provided for agitating particulate separation material held in the compartments. The purpose of the agitation means may be to assist flow of the fluid around the particulate separation material. In this way, the effectiveness and rate of take up of a selected component contained in the fluid by the particulate separation material may be enhanced.

The agitation means may comprise a pulsation device. The pulsation device may comprise a diaphragm for pulsating fluid in the compartments. The pulsations may be delivered from a low point such as at or below the last compartment in the series of compartments. They may be delivered by a rubber diaphragm which is rapidly and periodically pulsated by a hydraulic ram. For example, the pulsations may be applied at a rate of one pulsation for every 0.1 seconds to 5 seconds. The individual pulsations may more preferably be applied at a rate of one every 0.5 to 2 seconds.

The separation apparatus may also include transfer means for transferring particulate separation material between the compartments. The transfer means may operate to serially transfer particulate separation material between the compartments so that material from the last particulate separation material containing compartment in the series is directed into the second last compartment, the material in the second last compartment is returned to the third last compartment and so on. In a typical case such as one where there is a column of four compartments loaded with particulate separation material, material from the third last compartment is transferred to the first compartment. The arrangement may therefor be such that the transfer means also operates to transfer the particulate separation material from the first compartment out of the separation apparatus to be made ready for the recovery stage. The transfer means may include a screen or similar device to separate fluid and loaded particulate separation material. The fluid may be recycled to the column of compartments.

Thus, the invention in a further aspect covers the process of moving particulate separation material between compartments for the purpose of improving efficiency of up take of a chemical component from the fluid. It also covers the concept of agitating the particulate material by creating a variable flow of fluid.

The transfer means may comprise a series of conduits extending between adjacent compartments together with a pumping assembly for pumping a mixture of fluid and particulate separation means from one compartment to the other. A series of valves may be used to control the pumping of particulate separation means as and when required.

Preferred aspects of the invention will now be described with reference to the accompanying drawings.

DETAILED DESCRIPTION OF THE DRAWINGS

Figure 1:
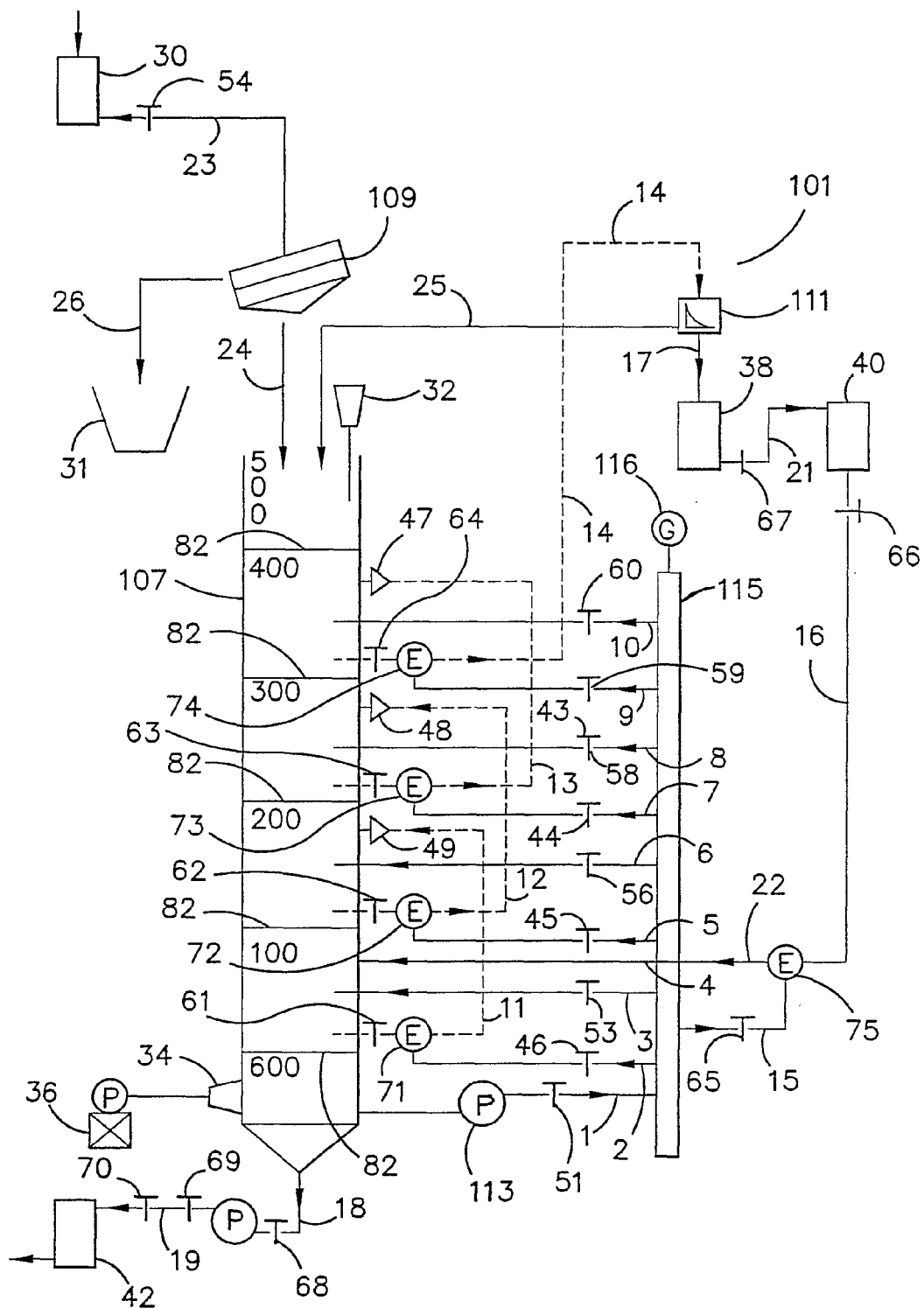
FIG. 1 shows a block circuit diagram of a separation apparatus according to the invention.

The various elements identified by numerals in the drawings are listed in the following integer list.

| | Integer List |
|---|---|
| 1 | Fluid line |
| 2 | Fluid line |
| 3 | Fluid line |
| 4 | Fluid line |
| 5 | Fluid line |
| 6 | Fluid line |
| 7 | Fluid line |
| 8 | Fluid line |
| 9 | Fluid line |
| 10 | Fluid line |
| 11 | Fluid line |
| 12 | Fluid line |
| 13 | Fluid line |
| 14 | Fluid line |
| 15 | Fluid line |
| 16 | Delivery line |
| 17 | Delivery line |
| 18 | Fluid line |
| 19 | Fluid line |
| 21 | Delivery line |
| 22 | Delivery line |
| 23 | Fluid line |
| 24 | Fluid |
| 25 | Fluid line |
| 26 | Waste line |
| 30 | Solution feed tank |
| 31 | Waste receptacle |
| 32 | Level sensor |
| 34 | Pulsation assembly |
| 36 | Hydraulic pump and sump |
| 38 | Stripping tank |
| 40 | Stripped resin tank |
| 42 | Tails tank |
| 43 | Valve |
| 44 | Vale |
| 45 | Valve |
| 46 | Valve |
| 47 | Non-return valve |
| 48 | Non-return valve |
| 49 | Non-return valve |
| 51 | Valve |
| 53 | Valve |
| 56 | Valve |
| 58 | Valve |
| 60 | Valve |
| 61 | Valve |
| 62 | Valve |
| 63 | Valve |
| 64 | Valve |
| 64 | Valve |
| 66 | Valve |
| 67 | Valve |
| 68 | Valve |
| 69 | Valve |
| 70 | Valve |
| 71 | Eductor |
| 72 | Eductor |
| 73 | Eductor |
| 74 | Eductor |
| 75 | Eductor |
| 78 | Hopper |
| 79 | Screen |
| 80 | Vibrator |
| 81 | Screen |
| 82 | Screen |
| 83 | Launder |
| 85 | Elements |
| 86 | Rubber diaphragm |
| 87 | Housing |
| 88 | Back plate |
| 100 | Compartment |
| 101 | Ion exchange assembly |
| 103 | Base |
| 105 | Frame |
| 107 | Resin column |
| 109 | Feed assembly |
| 111 | Harvesting assembly |
| 112 | Primary pumping assembly |
| 113 | Secondary pumping assembly |
| 115 | Manifold |
| 116 | Pressure gauge |
| 200 | Compartment |
| 300 | Compartment |
| 400 | Compartment |
| 500 | Compartment |
| 600 | Compartment |

In the drawings, the use of the same numerals throughout the drawings refers to the use of the same components or integers. However, in referring to FIGS. 1 to 3 of the drawings it should be noted that the position of the valves shown in FIG. 1 may be slightly changed with respect to the position of some of the valves shown in FIGS. 2 and 3. However, it should be noted the valves are located in lines where they produce essentially the same effect.

Referring to FIGS. 1 to 4, there is shown an ion exchange assembly generally designated 101 based around a resin column 107.

The resin column is fed via a feed assembly 109, such as a screen, which delivers a solution such as a gold bearing solution from the solution feed tank 30 via the feed assembly to the resin column 107.

Charged resin is taken up by the harvesting assembly 111 from whence it is delivered to the loaded resin stripping tank 38. Stripped resin from the stripping tank is periodically delivered via delivery line 21 when valve 67 is opened to the stripped resin tank 40 ready for use as and when required.

The resin column 107 comprises a number of resin containing compartments 100, 200, 300 and 400 arranged as a vertical column with the compartments in series going up the column.

The top of the column includes a compartment 500 free of ion exchange resin and the bottom compartment 600 also comprises a compartment 600 free of resin.

The various compartments are separated by screens 82 which are sized so as to allow flow of fluid 24 from the feed assembly serially through the column compartments whilst retaining the ion exchange resin within each compartment.

A pulsation assembly 34 driven through the hydraulic pump and sump 36 applies a pulse through a diaphragm to the fluid in compartment 600. This pulse is transmitted through the fluid in the column of compartments to agitate the resin contained in the various compartments and hence facilitate contact between fluid charged with gold or other material and the resin. Typically, the pulsation rate may have a cycle time between 0.2 and 2 seconds.

The primary pumping assembly 112 is configured so as to pump tails from the compartment 600 via the fluid line 18 and 19 to the tails tank 42. Valves 68, 69 and 70 are provided for controlling flow of tails to and from the primary pumping assembly 112.

At the input stage of the resin column, the feed assembly 109 separates coarse particles mixed with fluid delivered by the fluid line 23 from the fluid by screening. It delivers the screened coarse particles via the waste line 26 to the waste receptacle 31.

The filtered fluid 24 emanating from the feed assembly 109 is delivered into the first of the compartments 500 as is the recycled fluid delivered via fluid line 25. A level sensor 32 is provided to sense the level of fluid in compartment 500 so as to allow control of fluid flow into and through the resin column 107.

In a typical operation for adsorbing gold ions in solution from a fluid using an ion exchange resin, the filtered fluid 24 still containing a degree of entrained fine particles percolates through the compartments comprising the resin exchange column in the initial stages of the operation. During this stage the valve 68 is open and the pulsation assembly is operating to agitate the resin in the compartments. This agitation has the effect of facilitating contact between the fluid and the resin. It also operates to allow entrained fine particles to pass through the resin exchange column more freely with less likelihood of blockage and/or reduction in flow through the column.

On exiting the column and passing through open valve 68, it is pumped by the primary pumping assembly through the open valves 69 and 70 into the tails tank 42 where the entrained fine particles are separated and the fluid is recycled to a leach reactor and hence back to the solution feed tank 30.

When sufficient loaded fluid has passed through column to bring the gold ion loading of the resin in compartment 400 up to an appropriate level, valves 54 and 68 are closed, and the pulsation and the primary pumping assembly are stopped. In a series of operations described below the loaded resin from chamber 400 is pumped to the stripping tank 38 and the resin in each of chambers 100, 200, 300 is moved to the next upwardly adjacent chamber. The resin in chamber 100 is replaced with resin from the stripped resin tank 40.

As the first step in the resin transfer process, pressurization of the manifold 115 for transfer of resin is initiated by activating the secondary pumping assembly 113 to pump fluid via fluid line 1 to the manifold 115.

In the initial stages of the stepwise resin movement process the valve 51 is opened, to allow delivery of fluid to the manifold 115 and the valves 43 to 46, 53, 56, 58 and 61 to 64 are closed.

Pressure in the manifold is monitored via the pressure gauge 116. The pressure is regulated so as to allow enough pressure to drive the eductors.

When it reaches a predetermined level, valves 59 and 64 are opened to cause the mixture of loaded resin and fluid in compartment 400 to flow through eductor 74 along line 14 to the harvesting assembly 111 where the resin is separated from the fluid and directed via line 17 to the stripping tank 38. The separated fluid is redirected to the column via line 25.

When substantially all loaded resin has been removed from compartment 400, valves 59, 60 and 64 are closed and valves 44, 58 and 63 are opened. Fluid loaded with resin from compartment 300 flows through eductor 73, fluid line 13 and one way valve 47 into compartment 12. A similar procedure is then employed to move resin in compartment 200 to compartment 300 followed by a further similar procedure for moving resin from compartment 100 to compartment 200.

Compartment 100 is then refilled with resin from stripped resin tank 40 by opening valves 65, 66 to flow resin through eductor 75 along flow lines 16.

After the bottom resin compartment 100 has been refilled with stripped resin, the secondary pumping assembly is switched off, the valves 65, 66 and 51 are closed, valves 68, 69 and 70 are opened and the primary pumping assembly 112 and pulsation assembly 34 including hydraulic pump and sump 36 are reactivated to restart flow of fluid through the resin column until the resin in compartment 400 is duly loaded and the whole cycle is repeated.

Thus it can be seen that the arrangement shown allows for ready recycling of resin without moving the resin column, as is the case in prior art processes whilst at the same time ensuring effective exposure of the resin to the gold bearing fluid.

Figure 2:
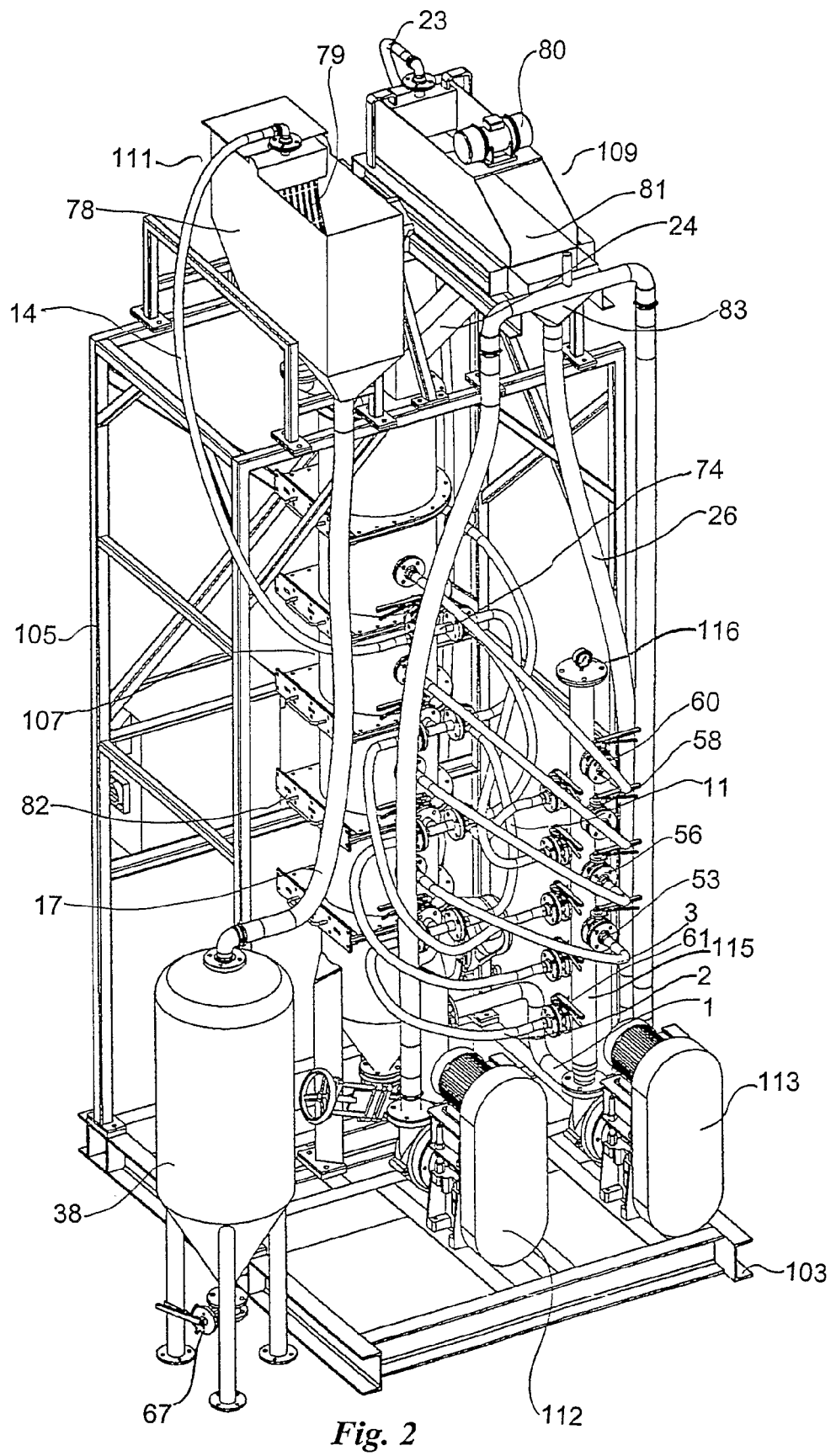
FIG. 2 shows a perspective view of an apparatus according to the invention.
Figure 3:
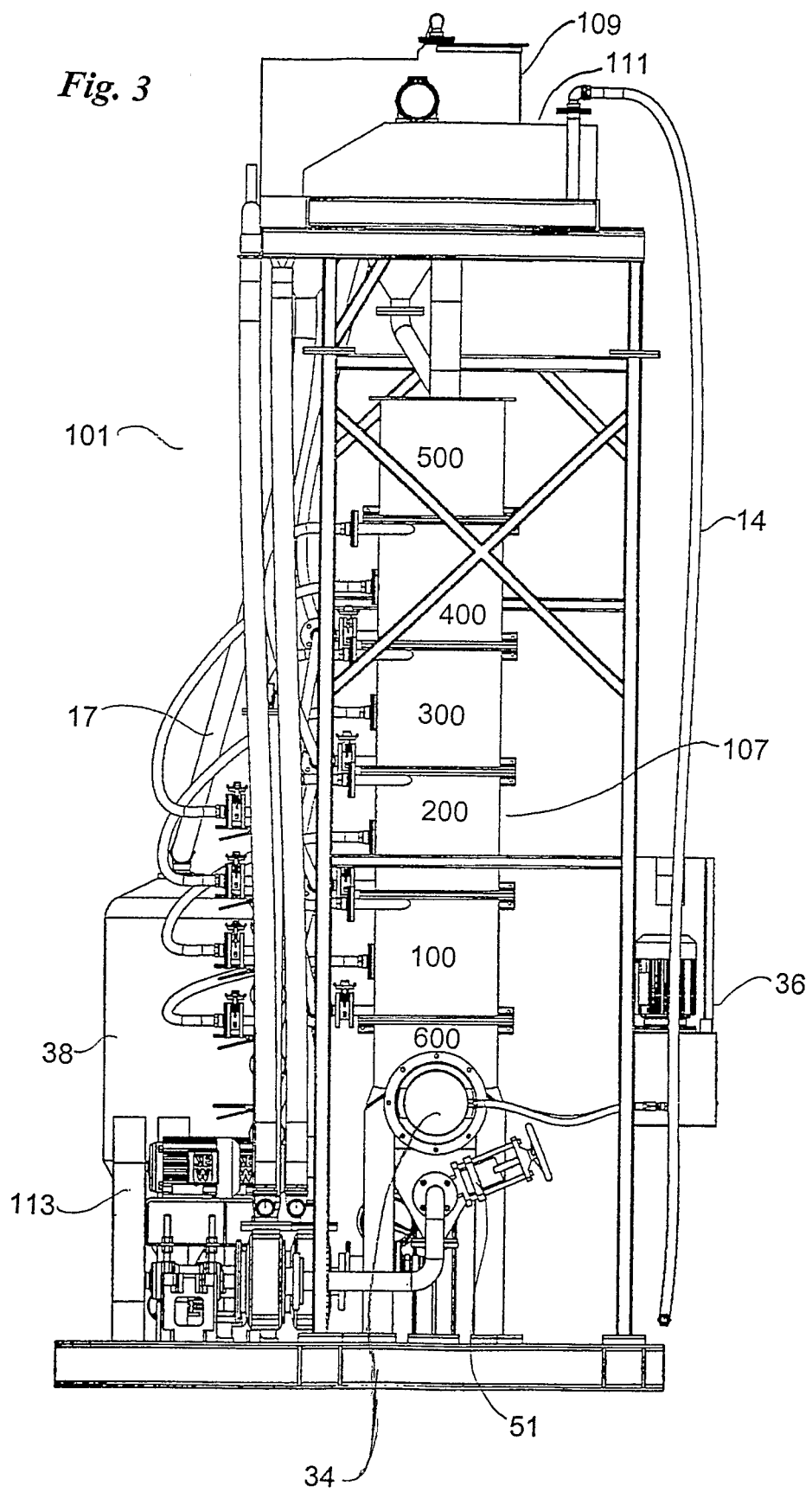
FIG. 3 shows an elevational view of the apparatus of FIG. 2 rotated clockwise through 135°.
Figure 4:
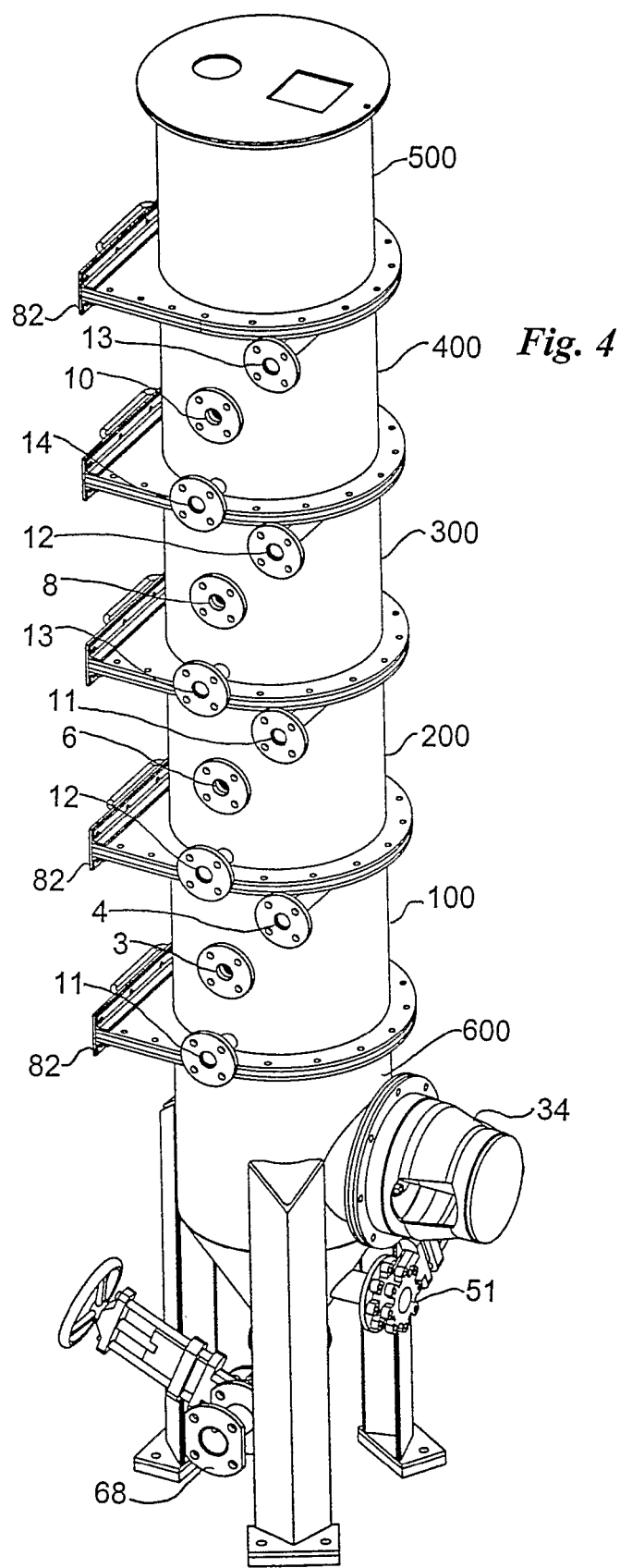
FIG. 4 shows a perspective view of the ion exchange column used in the apparatus of FIGS. 2 and 3.

Referring particularly to FIGS. 2 to 4, as most of the components shown in these drawings have been mentioned in the previous description with particular reference to FIG. 1, the description with regard to these drawings will be limited to additional elements which have not already been described.

It can be seen that the ion exchange assembly 101 has a base 103 and a frame 105.

The harvesting assembly comprises a hopper 78 for receiving charged resin mixed with fluid from the fluid line 14 and directing this mixture over the screen 79. The screen 79 separates the charged resin from the fluid.

The feed assembly 109 includes a vibrator 80 for vibrating the screen 81 so as to deliver coarse particulate material into the launder 83 and hence the waste line 26. The resulting filtered fluid for treatment including some fine entrained particulate material is directed to the first compartment 500.

Figure 6:
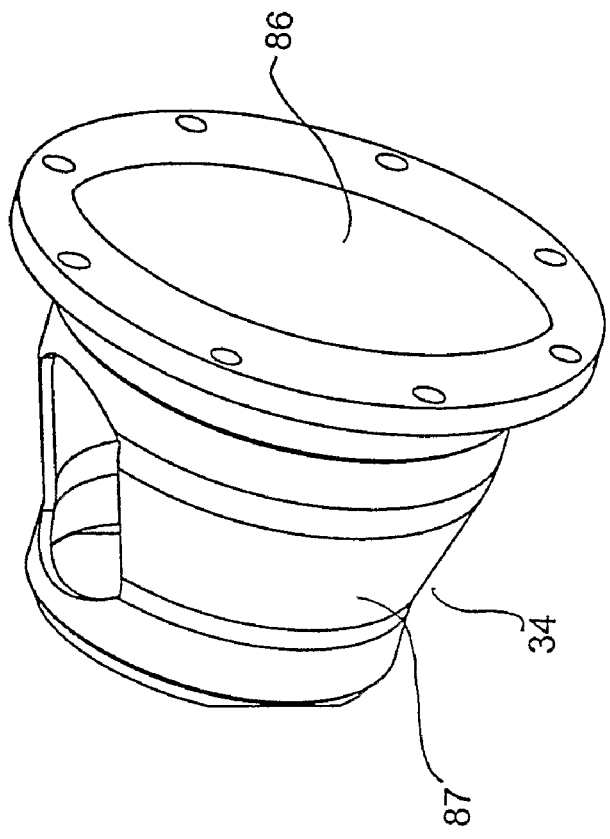
FIG. 6 shows a perspective view of the pulsation assembly of FIG. 5 rotated through 180°.
Figure 5:
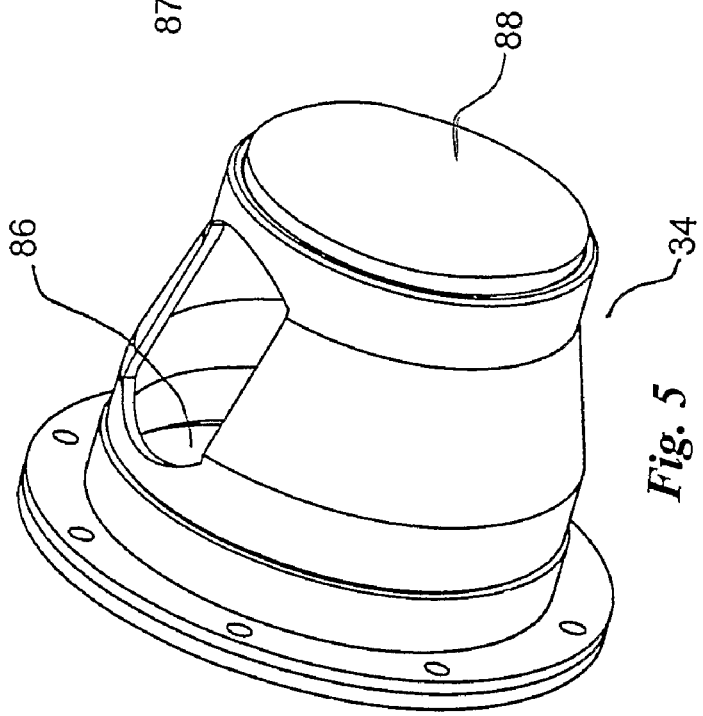
FIG. 5 shows a perspective view of a pulsation assembly used in the apparatus of FIG. 2.

Referring to FIGS. 5 and 6, the pulsation assembly comprises a bell shaped housing 87, having a back plate 88 and a rubber diaphragm 86. A hydraulic ram (not shown) is held within the housing and is secured to the back plate 88. The ram is arranged so as to push the rubber diaphragm 86 periodically.

Figure 7:
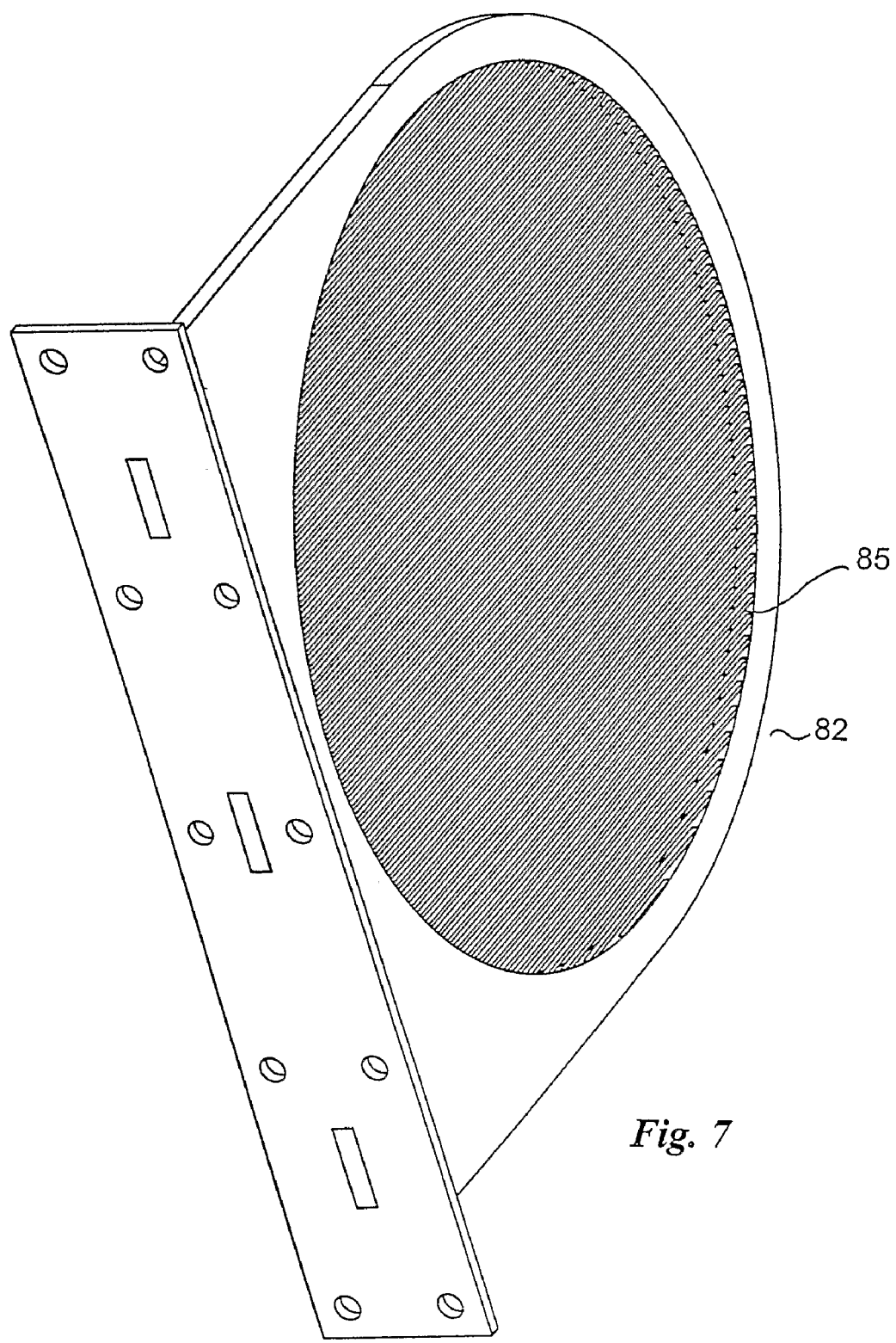
FIG. 7 shows a perspective view of a screen used in the apparatus of FIG. 2.

Referring to FIG. 7, it can be seen that the screen 82 used to separate the various compartments comprises a number of elements 85 in the form of wires running parallel to each other with a spacing of about 0.4 mm between the wires. The wires are suitably wedge wire to reduce the likelihood of "pegging" of particulate material in the screen. The advantage of using this type of screen assembly apart from reducing the likelihood of "pegging" is that it presents a large surface area through which the fluid may flow and hence optimizes efficiency. Typically, the amount of open surface area in the screen may be greater than 25% of the surface area covered by the screen elements.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A separation apparatus comprising,
    a series of compartments for holding particulate separation material arranged so as to allow fluid to flow through the compartments in a primary direction from a first compartment in the series to a last compartment in the series the series of compartments being arranged as a vertical column with the first of the series of compartments being located at the top of the column,
    a feed line for directing a flow of the fluid into the first of the series of compartments in the primary direction,
    barriers for preventing flow of particulate separation material between compartments in the primary direction,
    a ram arranged to apply pulses to the column to agitate the particulate separation material wherein the ram is a hydraulic ram arranged to apply pulses through a diaphragm to a compartment located at a base of the column; and,
    a pumping assembly arranged to pump a mixture of the particulate separation material and the fluid from the first compartment into a recovery stage, and to pump the particulate separation material between compartments in a flow direction opposite to the primary direction.

2. The separation apparatus according to claim 1 wherein the pumping assembly is arranged to pump the particulate separation material from the recovery stage to the last compartment in the series.

3. The separation apparatus according to claim 2 wherein the pumping assembly comprises,
    a pump arranged to pump the fluid into each one of the series of compartments,
    a flow control valve for each of the series of compartments, each flow control valve being adapted to control the pumping of fluid into a respective compartment,
    transfer means arranged to allow fluid to flow from a compartment lower in the series to an adjacent compartment higher in the series when the respective valve for the lower compartment is open.

4. The separation apparatus according to claim 3 wherein the transfer means comprises an eductor supplied with fluid by the pump.

5. The separation apparatus according to claim 1 wherein the compartment at the base of the column is free of particulate separation material and is arranged immediately below the last compartment in the series.

6. The separation apparatus according to claim 5 wherein the hydraulic ram is set to apply a pulsation once every 0.1 to 5 seconds.

7. The separation apparatus according to claim 1 wherein the barriers each comprise a screen interposed between adjacent compartments.

8. The separation apparatus according to claim 1 wherein the recovery stage comprises a harvesting assembly arranged to separate the fluid from the particulate separation material and to return the separated fluid to the series of compartments.

9. The separation apparatus according to claim 8 wherein the recovery stage comprises,
    a stripping tank for stripping loaded material from the particulate separation material,
    a holding tank for receiving stripped particulate separation material from the stripping tank, and
    a return line for transferring stripped particulate separation material to the last compartment in the series.

10. The separation apparatus according to claim 9 wherein the return line comprises an eductor operated by fluid pressure from the pump.

11. The separation apparatus according to claim 1 comprising a screen arranged to separate large particulates from the fluid before it flows through the series of the compartments.

12. The separation apparatus according to claim 1 wherein the particulate separation material comprises at least one of an ion exchange resin, carbon granules and aggregates coated with surface active agent.

13. The separation apparatus according to claim 12 wherein the particulate separation material comprises an ion exchange resin and the fluid is an aqueous solution containing gold ions.

* * * * *